United States Patent
Momchilov et al.

(10) Patent No.: US 11,212,113 B2
(45) Date of Patent: Dec. 28, 2021

(54) SYSTEMS AND METHODS PROVIDING CONNECTION LEASE ANTI-THEFT FEATURES FOR VIRTUAL COMPUTING SESSIONS

(71) Applicant: CITRIX SYSTEMS, INC., Fort Lauderdale, FL (US)

(72) Inventors: Georgy Momchilov, Parkland, FL (US); Hubert Divoux, Parkland, FL (US); Roberto Valdes, Weston, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 275 days.

(21) Appl. No.: 16/416,452

(22) Filed: May 20, 2019

(65) Prior Publication Data

US 2020/0374136 A1 Nov. 26, 2020

(51) Int. Cl.
*H04L 9/32* (2006.01)
*H04L 9/08* (2006.01)
*H04L 9/30* (2006.01)

(52) U.S. Cl.
CPC .......... *H04L 9/3263* (2013.01); *H04L 9/0819* (2013.01); *H04L 9/30* (2013.01); *H04L 9/321* (2013.01)

(58) Field of Classification Search
None
See application file for complete search history.

(56) References Cited

U.S. PATENT DOCUMENTS

| | | | |
|---|---|---|---|
| 7,724,657 B2 | 5/2010 | Rao et al. | |
| 8,001,232 B1* | 8/2011 | Saulpaugh | G06Q 30/06 709/224 |
| 8,141,075 B1 | 3/2012 | Chawla et al. | |
| 8,555,274 B1 | 10/2013 | Chawla et al. | |
| 9,009,327 B2 | 4/2015 | Adhya et al. | |
| 9,021,475 B2 | 4/2015 | Nimmagadda et al. | |
| 9,176,744 B2 | 11/2015 | Lee | |
| 9,426,227 B2 | 8/2016 | Bell | |
| 9,538,345 B2 | 1/2017 | Sah et al. | |

(Continued)

OTHER PUBLICATIONS

U.S. Appl. No. 16/194,823, filed Nov. 19, 2018 Singleton et al.

(Continued)

*Primary Examiner* — Jeffrey C Pwu
*Assistant Examiner* — Mayasa A. Shaawat
(74) *Attorney, Agent, or Firm* — Allen, Dyer, Doppelt + Gilchrist, PA

(57) ABSTRACT

A computing device may include a memory and a processor cooperating with the memory and configured to receive a connection request from a client device having a public/private encryption key pair associated therewith. The connection request may be based upon a connection lease and the public key for the client device, and the connection lease may be generated based upon an authenticated version of the public key for the client device. The processor may also be configured to verify that the authenticated version of the public key upon which the connection lease was generated matches the public key for the client device and authorize a connection with the client device and provide the client device with access to a virtual computing session via the connection.

21 Claims, 10 Drawing Sheets

(56) References Cited

U.S. PATENT DOCUMENTS

2013/0219468 A1* 8/2013 Bell .................... H04L 63/0428
  726/4

OTHER PUBLICATIONS

U.S. Appl. No. 16/241,047, filed Jan. 7, 2019 Singleton et al.
Georgy Momchilov "HDX Adaptive Transport and EDT: ICA™ s New Default Transport Protocol (Part II)" https://www.citrix.com/blogs/2017/11/20/hdx-adaptive-transport-and-edt-icas-new-default-transport-protocol-part-ii; Nov. 20, 2017; pp. 7.

* cited by examiner

SYSTEMS AND METHODS PROVIDING CONNECTION LEASE ANTI-THEFT FEATURES FOR VIRTUAL COMPUTING SESSIONS

BACKGROUND

Many organizations are now using application and/or desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop and/or application inside a virtual machine that resides on a server. Virtualization systems may also be implemented in a cloud computing environment, or cloud system, in which a pool of computing resources (e.g., desktop virtualization servers), storage disks, networking hardware, and other physical resources may be used to provision virtual desktops, and/or provide access to shared applications.

SUMMARY

A computing device may include a memory and a processor cooperating with the memory and configured to receive a connection request from a client device having a public/private encryption key pair associated therewith. The connection request may be based upon a connection lease and the public key for the client device, and the connection lease may be generated based upon an authenticated version of the public key for the client device. The processor may also be configured to verify that the authenticated version of the public key upon which the connection lease was generated matches the public key for the client device and authorize a connection with the client device and provide the client device with access to a virtual computing session via the connection.

In an example embodiment, the processor may be further configured to, prior to authorizing the connection with the client device, initiate a challenge to be signed by the client device with the private key associated with the client device, and validate the signed response with the public key for the client device. Moreover, the processor may initiate the challenge and validate the signed response prior to or after verifying that the authenticated version of the public key upon which the connection lease was generated matches the public key for the client device. Moreover, prior to the challenge and response, the processor may be further configured to validate a signature and date associated with the connection lease, and validate that the public key is valid The connection lease may include a hash of the authenticated version of the public key for the client device, for example. In addition, the public/private key pair may be generated at the client device using a hardware-backed key store. Furthermore, the processor may also be configured to drop the connection with the client device based on a failure to verify that the authenticated version of the public key upon which the connection lease was generated matches the public key for the client device.

A related method may include receiving a connection request at a virtual delivery appliance from a client device having a public/private encryption key pair associated therewith, where the connection request is based upon a connection lease and the public key for the client device, and the connection lease is generated based upon an authenticated version of the public key for the client device. The method may further include verifying at the virtual delivery appliance that the authenticated version of the public key upon which the connection lease was generated matches the public key for the client device and authorizing a connection with the client device and providing the client device with access to a virtual computing session via the connection.

A related computing system may include a server configured to generate a connection lease for a client device, where the client device have a public/private encryption key pair associated therewith, and the connection lease is generated based upon an authenticated version of the public key for the client device. The computing system may further include a virtual delivery appliance configured to receive a connection request from the client device based upon the connection lease and the public key for the client device. The virtual delivery appliance may also be configured to verify that the authenticated version of the public key upon which the connection lease was generated matches the public key for the client device and authorize a connection with the client device and provide the client device with access to a virtual computing session via the connection.

DETAILED DESCRIPTION

Figure 1:
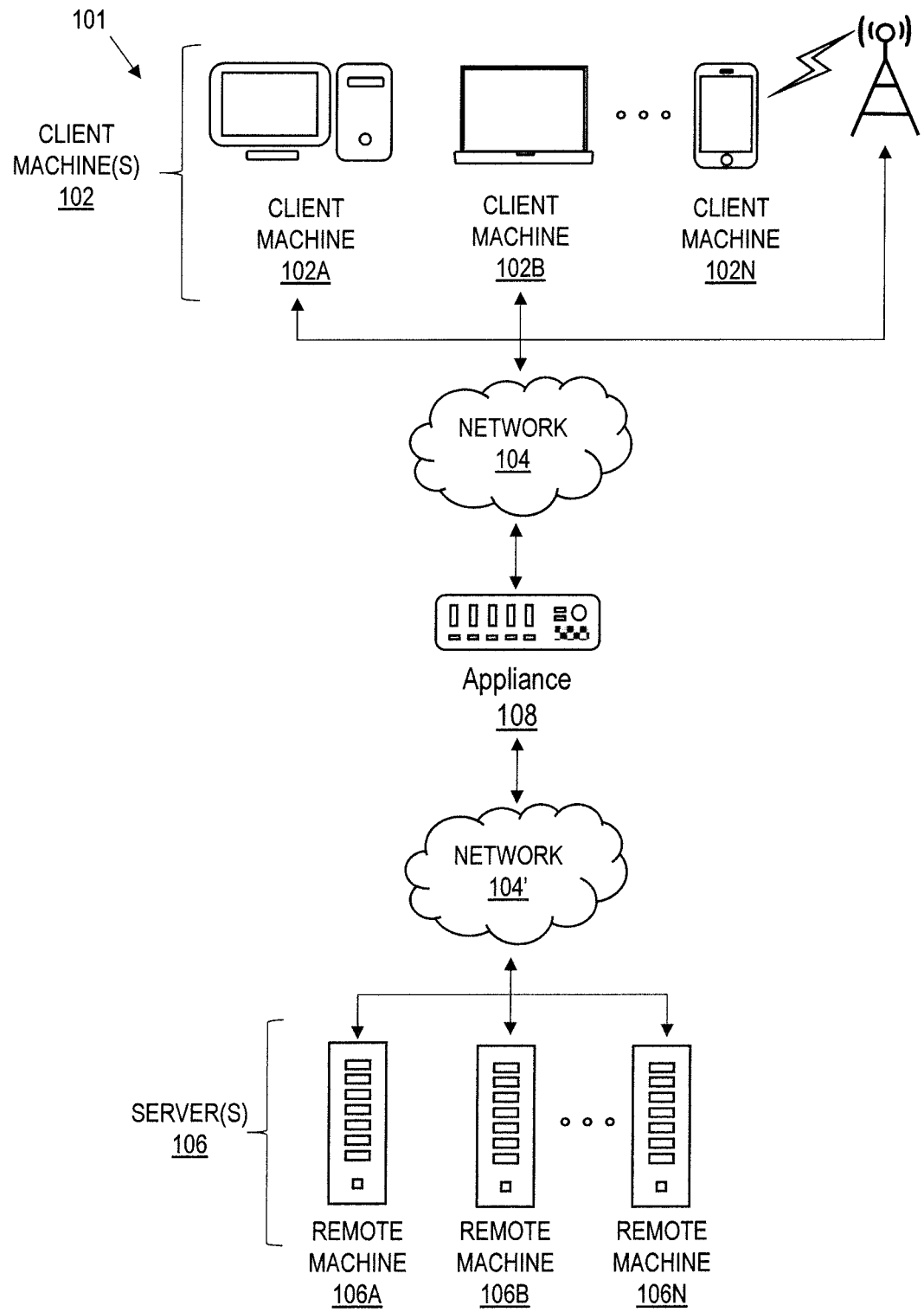
FIG. 1 is a block diagram of a network environment of computing devices in which various aspects of the disclosure may be implemented.

With any network infrastructure, remote or otherwise, security from external attacks is always a significant concern. With respect to remoting protocols such as Independent Computing Architecture (ICA), in some instances ICA files used for connection leases to access virtual computing sessions may be vulnerable to interception and replay attack. However, since connection leases are relatively long-lived (e.g., a few hours to weeks based on Information Technology (IT) policies), and therefore the attack opportunity window is much longer, security requirements are particularly important. Therefore, connection leases are encrypted and signed. Connection leases may also be revoked to cope with events such as a stolen client device, compromised user account, closed user account, etc.

However, these measures may still be insufficient in some circumstances. For example, a customer connection lease or lease token may have been stolen from a compromised client device, or may have been intercepted in transit from a Connection Lease Issuing Service (CLIS) to the client device. The lease or token may then potentially be used on a rogue client device, e.g., owned by a malicious actor, to connect to the host(s) included in the connection lease. This becomes more problematic as the CLs/lease tokens are longer-lived, because there is a longer opportunity for a malicious actor to initiate and continue malicious activities. Another potential security shortcoming with respect to typical connection lease infrastructures is that there may not be an adequate way to prevent the use of a valid customer lease on a different client device. That is, this could be done by supplying the stolen credentials of the user for which the customer lease was originally issued. Still another potential shortcoming in some connection lease infrastructures is that there may not be a way to prevent the use of a customer lease on the same client device by a different authenticated user, e.g., by another user on a multi-user machine (cross-session vulnerability).

The systems and methods set forth herein advantageously provide anti-theft mechanisms to help overcome the above-noted technical security challenges associated with computing networks, and more particularly virtual computing infrastructures. This may be accomplished by generating connection leases for connecting client devices with virtual computing sessions based upon an authenticated version of the public key for a respective client device, as will be discussed further below, to thereby help prevent the use of stolen credentials on unauthorized machines as well as cross-session vulnerability, for example.

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN);

a wide area network (WAN); software-defined networking in a wide area network (SD-WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

One particularly advantageous implementation of SD-WAN enterprises is provided by Citrix SD-WAN, which allows enterprises to render their WANs with more scalability, and in a cost-effective that is ready to connect to the cloud. Citrix SD-WAN contains an integrated database and deep packet inspection to identify applications, including individual SaaS applications, and intelligently steer traffic from the branch to the internet, cloud, or SaaS. Moreover, Citrix SD-WAN also provides the ability to route traffic from the branch to the Internet via a secure web gateway, delivering cloud-based security including firewall, URL filtering, and usage accounting.

Figure 2:
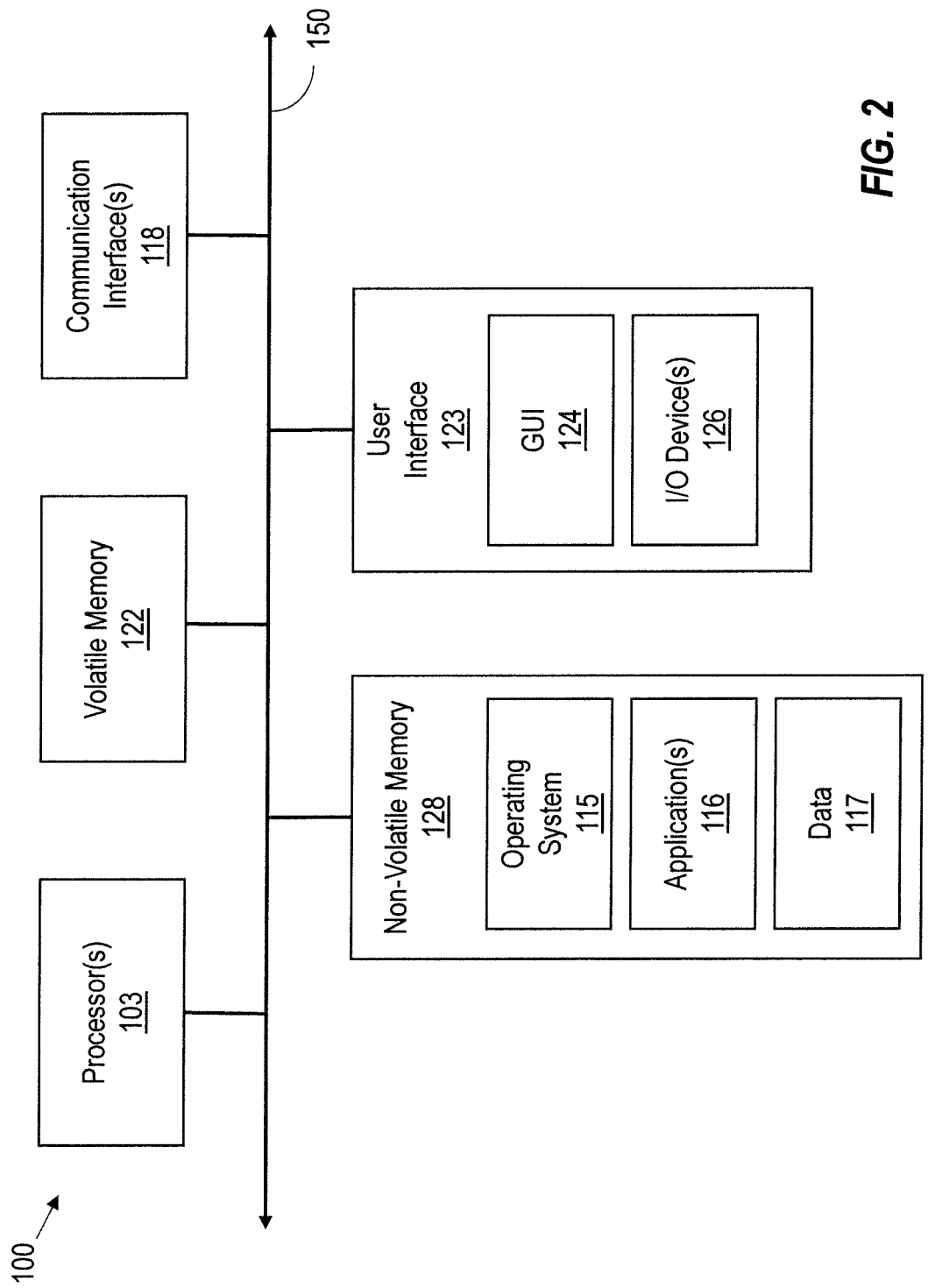
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a LAN, a WAN or SD-WAN, a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

An example virtualization server 106 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops, also from Citrix Systems. Citrix Virtual Apps and Desktops is an application virtualization solution that enhances productivity with universal access to virtual sessions including virtual app, desktop, and data sessions from any device, plus the option to implement a scalable VDI solution.

Figure 3:
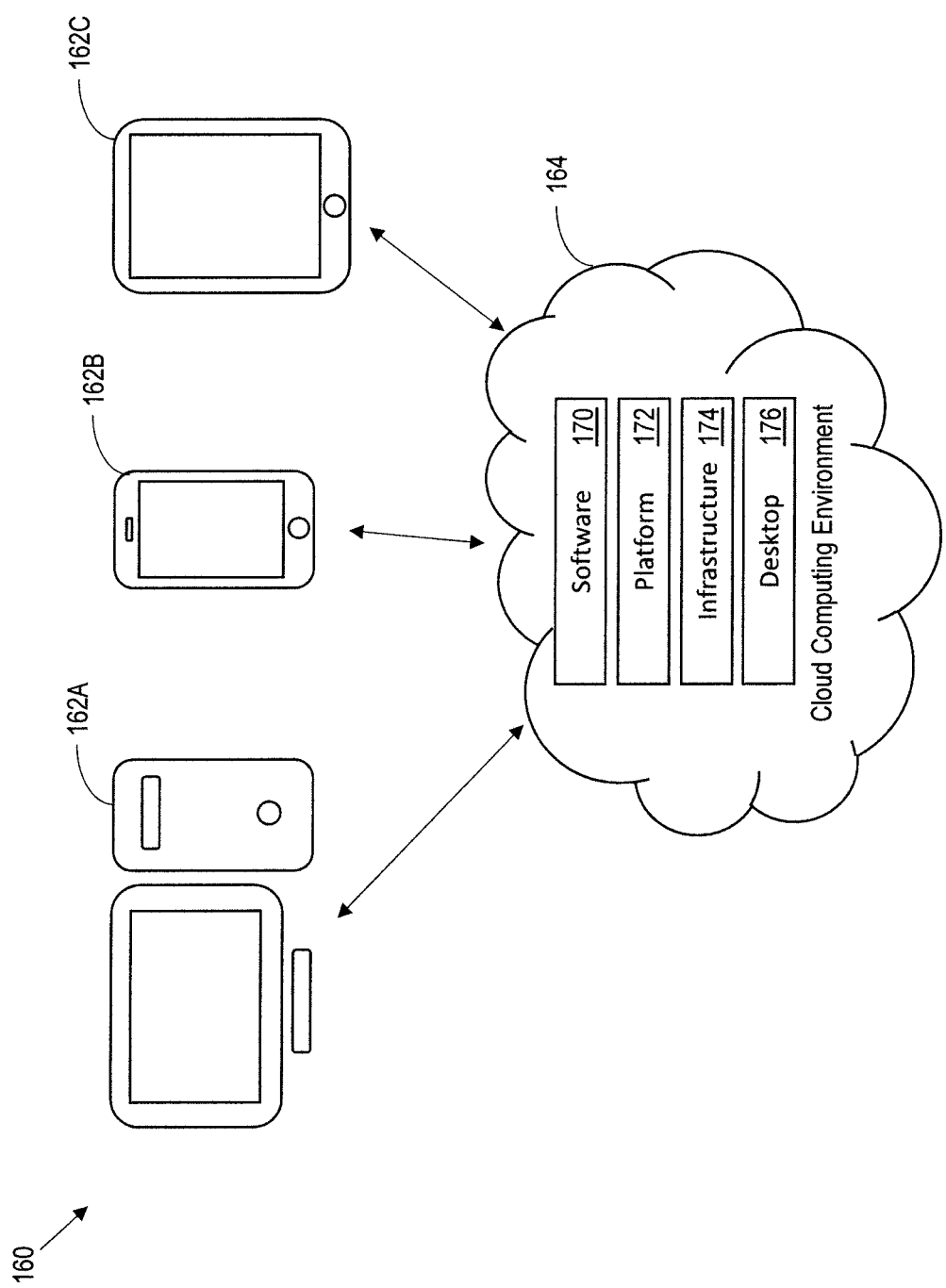
FIG. 3 is a schematic block diagram of a cloud computing environment in which various aspects of the disclosure may be implemented.

Referring to FIG. 3, a cloud computing environment 160 is depicted, which may also be referred to as a cloud environment, cloud computing or cloud network. The cloud computing environment 160 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 160, one or more clients 162A-162C (such as those described above) are in communication with a cloud network 164. The cloud network 164 may include back-end platforms, e.g., servers, storage, server farms or data centers. The users or clients 162A-162C can correspond to a single organization/tenant or multiple organizations/tenants. More particularly, in one example implementation the cloud computing environment 160 may provide a private cloud serving a single organization (e.g., enterprise cloud). In another example, the cloud computing environment 160 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 160 may provide a hybrid cloud that is a combination of a public cloud and a private cloud. Public clouds may include public servers that are maintained by third parties to the clients 162A-162C or the enterprise/tenant. The servers may be located off-site in remote geographical locations or otherwise.

The cloud computing environment 160 can provide resource pooling to serve multiple users via clients 162A-162C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 160 can provide on-demand self-service to unilaterally provision computing capabilities (e.g., server time, network storage) across a network for multiple clients 162A-162C. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 160 can provide an elasticity to dynamically scale out or scale in responsive to different demands from one or more clients 162. In some embodiments, the cloud computing environment 160 can include or provide monitoring services to monitor, control and/or generate reports corresponding to the provided shared services and resources.

In some embodiments, the cloud computing environment 160 may provide cloud-based delivery of different types of cloud computing services, such as Software as a Service (SaaS) 170, Platform as a Service (PaaS) 172, Infrastructure as a Service (IaaS) 174, and Desktop as a Service (DaaS) 176, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
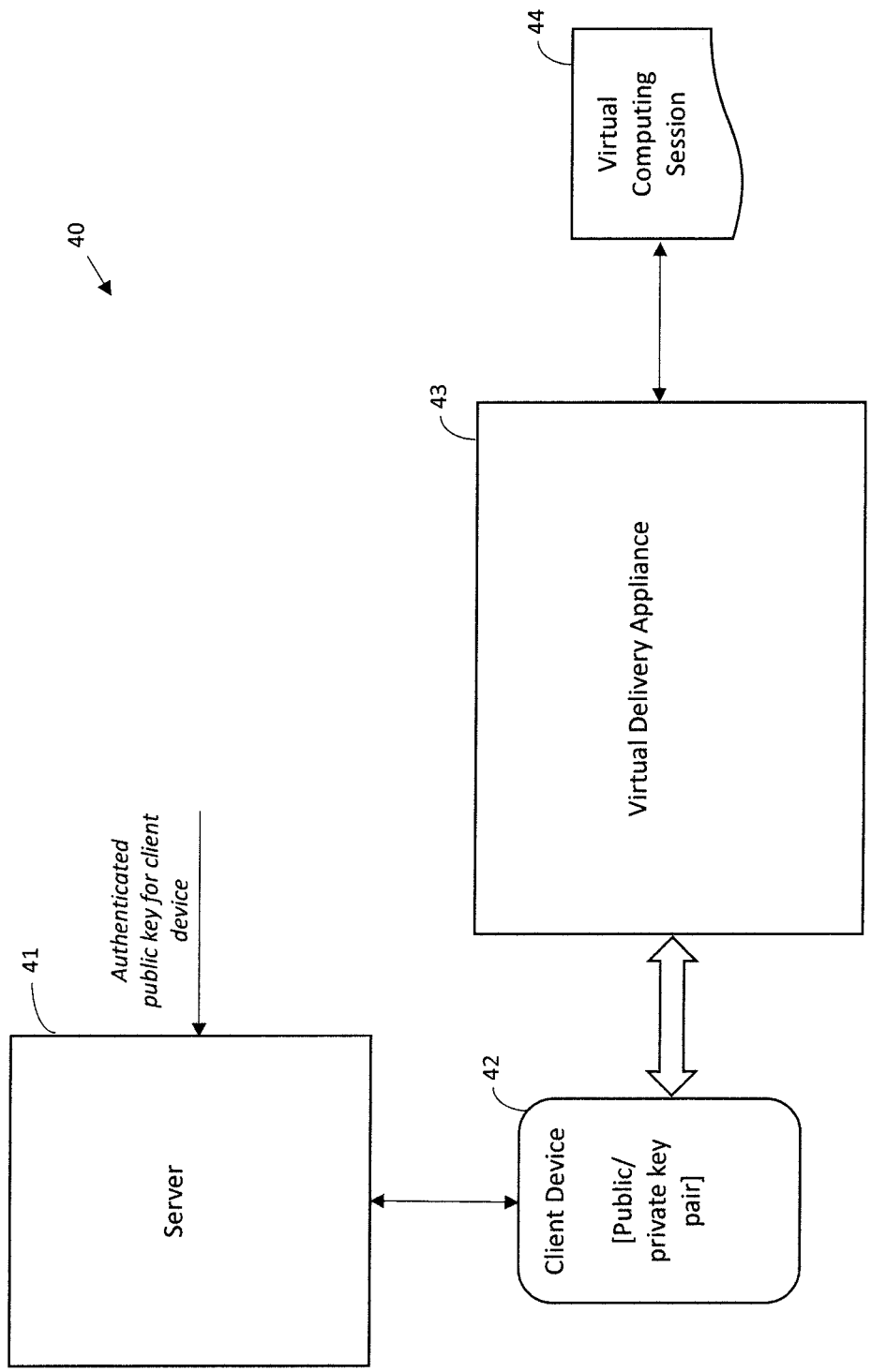
FIG. 4 is a schematic block diagram of a computing system providing secure connection lease features for client devices connecting to virtual computing sessions in an example embodiment.

Turning now to FIG. 4, a computing system 40 is first described which advantageously provides enhanced security measures for remote client access to virtual computing sessions through secure connection leases. For example, such virtual computing session may include virtual app/desktop sessions, Web/SaaS sessions, XenMobile (e.g., Secure Mail with Exchange Server), ShareFile or other cloud-based storage platforms, etc. One example architecture for providing access to virtual computing sessions is Citrix Virtual Apps and Desktops (CVAD) from the present Applicant Citrix Systems, Inc. Citrix Virtual Apps is an application virtualization approach that helps optimize productivity with universal access to virtual apps and server-based desktops from different client devices. CVAD carries all the same functionality as Citrix Virtual Apps, plus the option to implement a scalable Virtual Desktop Infrastructure (VDI). Citrix Virtual Apps/CVAD are available as a cloud service or on-premises software configuration.

Such computer virtualization infrastructures may utilize Independent Computing Architecture (ICA) protocol in combination with implementing connection leases (CLs) for authenticating client devices to access respective virtual sessions and computing resources. ICA is a protocol designed for transmitting Windows graphical display data as well as keyboard and mouse input over a network. Connection descriptor files known as ICA files contain short-lived Secure Ticket Authority (STA) and logon tickets. The STA ticket may be used to authorize a connection to a host or virtual delivery appliance (e.g., Citrix Virtual Delivery Agent (VDA)) via a gateway (e.g., Citrix Gateway). The logon ticket may single-sign-on (SSOn) the user into the virtual computing session. In the case of CVAD, this is done through a "high-definition" experience (HDX) session, which may be available to users of centralized applications and desktops, on different client devices and over different networks. The term Citrix HDX protocol may be used synonymously with the ICA remoting protocol.

The computing system 40 advantageously provides anti-theft mechanisms to help address the above-noted technical challenges. In the present example, the computing system 40 illustratively includes a server 41 configured to generate a connection lease for a client device or endpoint 42, such as those discussed above. As will be discussed further below, the client device 42 has a unique public/private encryption key pair associated therewith, and the connection lease is advantageously generated based upon an authenticated version of the public key for the client device, e.g., signed by a Root of Trust (RoT), as will be discussed further below. The computing system 40 further illustratively includes a virtual delivery appliance 43 configured to receive a connection request from the client device 42 based upon the previously generated connection lease and the public key for the client device. The virtual delivery appliance 43 is also configured to verify that the authenticated version of the public key upon which the connection lease was generated matches the public key for the client device 42 and, responsive thereto, authorizes a connection with the client device and provides the client device with access to a virtual computing session 44 via the connection.

Figure 5:
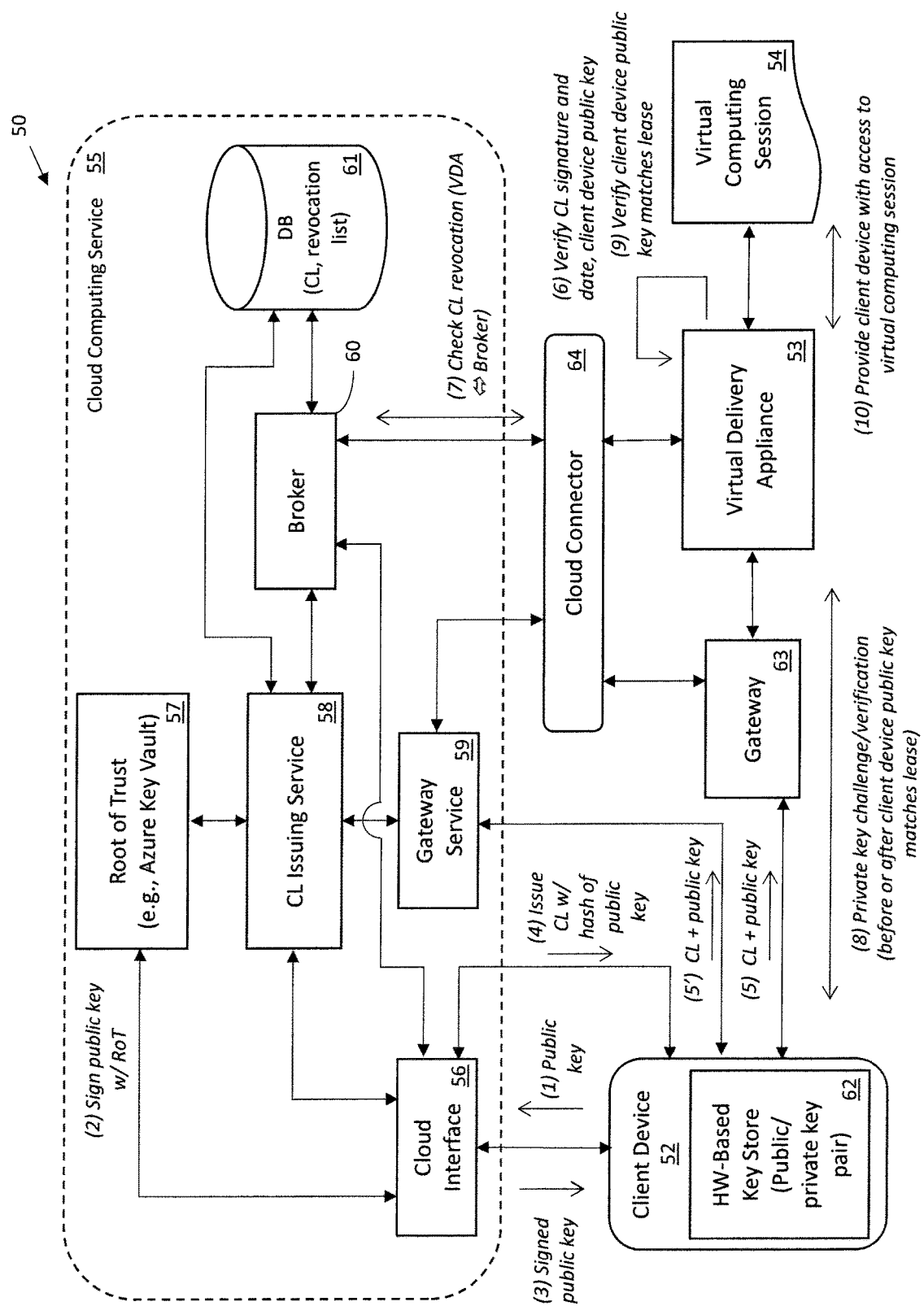
FIG. 5 is an example cloud-based implementation of the system of FIG. 4.

The foregoing will now be further described in the context of an example implementation of a computing system 50 shown in FIG. 5. In the illustrated example, the above-described server 41 and lease generation functions are performed within a cloud computing service 55 (e.g., Citrix Cloud) which illustratively includes a cloud interface 56 configured to interface with the client device 52 for enrollment and lease generation. In an example implementation, the cloud interface 56 may be implemented with Citrix Workspace, and the client device 52 may be running Citrix Workspace App, although other suitable platforms may be used in different embodiments. The cloud computing service 55 further illustratively includes a root of trust (RoT) 57, Connection Lease Issuing Service (CLIS) 58, gateway service 59, broker 60, and database 61, which will be described further below.

As noted above, the client device 52 has a public-private encryption key pair associated therewith, which in the illustrated example is created by a hardware-backed key store 62. The hardware-backed key store 62 prevents the client device 52 operating system (OS) from accessing or sharing the private key. The client device 52 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. The client device 52 provides its public key to the cloud interface 56 (step (1) in FIG. 5), which then has the public key signed by the RoT 57 (step (2) in FIG. 5) and returns the signed public key to the client device 52 (step (3) in FIG. 5). As part of the same or different steps (not shown), the client device 52 also obtains from the cloud interface 56 or CLIS 58 the public key of the RoT 57 and the public key of the CLIS 58 signed by the RoT 57.

The client device 52 may then communicate with the CLIS 58 via the cloud interface 56 to obtain the connection lease (step (4) in FIG. 5), as will be discussed further with reference to FIGS. 6A-6B. The client device 52 public key may be provided to a host or virtual delivery appliance 53 (e.g., Citrix VDA) either indirectly via the broker 60 or directly by the client device. If the client device 52 public key is indirectly provided to the virtual delivery appliance 53, then the security associated with the client-to-broker communications and virtual deliver appliance-to-broker communications may be leveraged for secure client public key transmission. However, this may involve a relatively large number of client public keys (from multiple different client devices 52) being communicated indirectly to the virtual delivery appliance 53.

On the other hand, if the client device 52 public key is directly provided by the client device to the virtual delivery agent 53, as in the present case (step (5) in FIG. 5), the client device public key may be signed by the RoT 57 beforehand, as in the present case (steps (1), (2) and (3) in FIG. 5). Both the client device 52 and the virtual delivery appliance 53 trust the RoT 57. Since the virtual delivery appliance 53 trusts the RoT 57 and has access to the RoT 57 public key, the virtual delivery appliance is able to verify the validity of the client device 52 public key signature and, if valid, may then trust the client device public key (step (6) in FIG. 5). In the illustrated example, the signed public key of the client device 52 is provided directly to the virtual delivery appliance 53 along with the customer lease via a gateway 63. In an example implementation, the gateway 63 may be implemented using Citrix Gateway, for example, although other suitable platforms may also be used in different embodiments. In another example implementation, the signed public key of the client device 52 is provided directly to the virtual delivery appliance 53 along with the connection lease via a gateway service 59 (step (5') in FIG. 5). In yet another example implementation, the signed public key of the client device 52 is provided along with the customer lease in direct communication with the virtual delivery appliance 53 without involving a gateway.

The virtual delivery appliance 53 and gateway 63 may communicate with the broker 60 and gateway service 59 (which may be implemented using Citrix Secure Web Gateway, for example) via a cloud connector 64. In an example embodiment, the cloud connector 64 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 52 public key or a hash of the client device public key (thumbprint) is included in the connection lease generated by the CLIS 58 and is one of the fields of the connection lease that are included when computing the signature of the connection lease. The signature of the connection lease helps ensure that the connection lease contents are valid and have not been tampered with. As a result, a connection lease is created for the specific client device 52, not just a specific authenticated user. In addition, since the connection lease itself is signed, the connection lease does not need to contain a signed version of the client device 52 public key or a hash of a signed version of the client device 52 public key. Furthermore, the client device 52 public key or a hash of the client device public key (thumbprint) may be included in a manifest part of the connection lease, which is not encrypted.

The virtual delivery appliance 53 may validate the signature and date of the received connection lease (also at step (6) in FIG. 5). If the signature of the connection lease is invalid or the date of the connection lease suggests that it has expired, virtual delivery appliance 53 may terminate the connection with the client device 52. The virtual delivery appliance 53 may be capable of validating the signature of the connection lease because it has the public key of the RoT 57 that it trusts and the public key of the CLIS 58 signed by the RoT, and the connection lease is signed by the private key of the CLIS 58. In particular, using the RoT public key, the virtual delivery appliance 53 may first validate that the public key of the CLIS 58 signed by the RoT is valid. Then the virtual delivery appliance 53 may use the public key of the CLIS 58 to validate the signature of the connection lease.

Furthermore, the virtual delivery appliance 53 may use a security key encryption-based challenge-response to validate that the client device 52 is the true owner of the corresponding private key. First, as previously discussed, the virtual delivery appliance 53 validates that the client device 52 public key is valid, and more particularly signed by the RoT 57 (step (6) in FIG. 5). In the illustrated example, the client device 52 public key was sent directly by the client device 52 to the virtual delivery appliance 53, as noted above. In some embodiments, customer lease revocation may be applied when a client device 52 or virtual delivery appliance 53 is either online or offline with respect to the CLIS 58 or broker 60. Being online is not a requirement for use of a connection lease since connection leases may be used in an offline mode. Connection lease and revocation list details may be stored in the database 61 for comparison by the broker 60 with the information provided to the virtual delivery appliance 53 periodically or upon demand (step (7) in FIG. 5). It should be noted that this step could be performed prior to validating the public key of the client device 52 in some embodiments, if desired. If the connection lease is found to be revoked, the virtual delivery appliance 53 may terminate the connection with the client device 52.

Second, upon early connection establishment between the client device 52 and virtual delivery appliance 53, the virtual delivery appliance challenges the client device to sign a nonce (an arbitrary number that is used, typically once, in a cryptographic communication) with its private key (step (8) in FIG. 5). The virtual delivery appliance 53 verifies the signature of the nonce with the client device 52 public key. This allows the virtual delivery appliance 53 to know that the client device 52 is in fact the owner of the corresponding private key. If the client device 52 does not successfully answer the challenge and is not verified to be the owner of the corresponding private key, the virtual delivery appliance 53 may terminate the connection with the client device 52.

Furthermore, the virtual delivery appliance 53 validates that the connection lease includes the public key (or hash of the public key) matching the signed and owner-validated client device 52 public key (step (9) in FIG. 5). More particularly, as previously discussed, the virtual delivery appliance 53 would have already validated the client lease signature and date (step (6) in FIG. 5). Moreover, the virtual delivery appliance 53 may verify that the connection lease includes the client device 52 public key, or a hash of the client device 52 public key, in which case the virtual delivery appliance computes the hash of the client device public key based on the signed and owner-validated client device 52 public key. If the connection lease includes the matching client device 52 public key, then the virtual delivery appliance 53 confirms that the client lease was sent from the client device for which it was created, and proceeds to provide the client device 52 access to the virtual computing session (step (10) in FIG. 5).

As a result, if a connection lease is stolen from the client device 52 and used from a malicious client device, the session establishment between the malicious client and the virtual delivery appliance 53 will not succeed because the malicious client device will not have access to the genuine client private key, this key being non-exportable and stored in the hardware-backed key store 62.

In some embodiments, the foregoing connection lease validation and client device 52 public key validation steps (illustrated as steps (6), (7), (8) and (9) of FIG. 5) may additionally or alternatively be performed by a gateway appliance, for example, gateway 63 or gateway service 59. In particular, similar to the virtual delivery appliance 53, the gateway appliance may be capable of validating the signature of the connection lease because it has the public key of the RoT 57 that it trusts and the public key of the CLIS 58 signed by the RoT, and the connection lease is signed by the private key of the CLIS 58. Additionally, the gateway appliance may have its own private-public key pair and may have its public key signed by the RoT 57. Therefore, the gateway appliance may be able to participate in challenge-response validation with the client device 52 and the virtual delivery appliance 53.

Figure 6A:
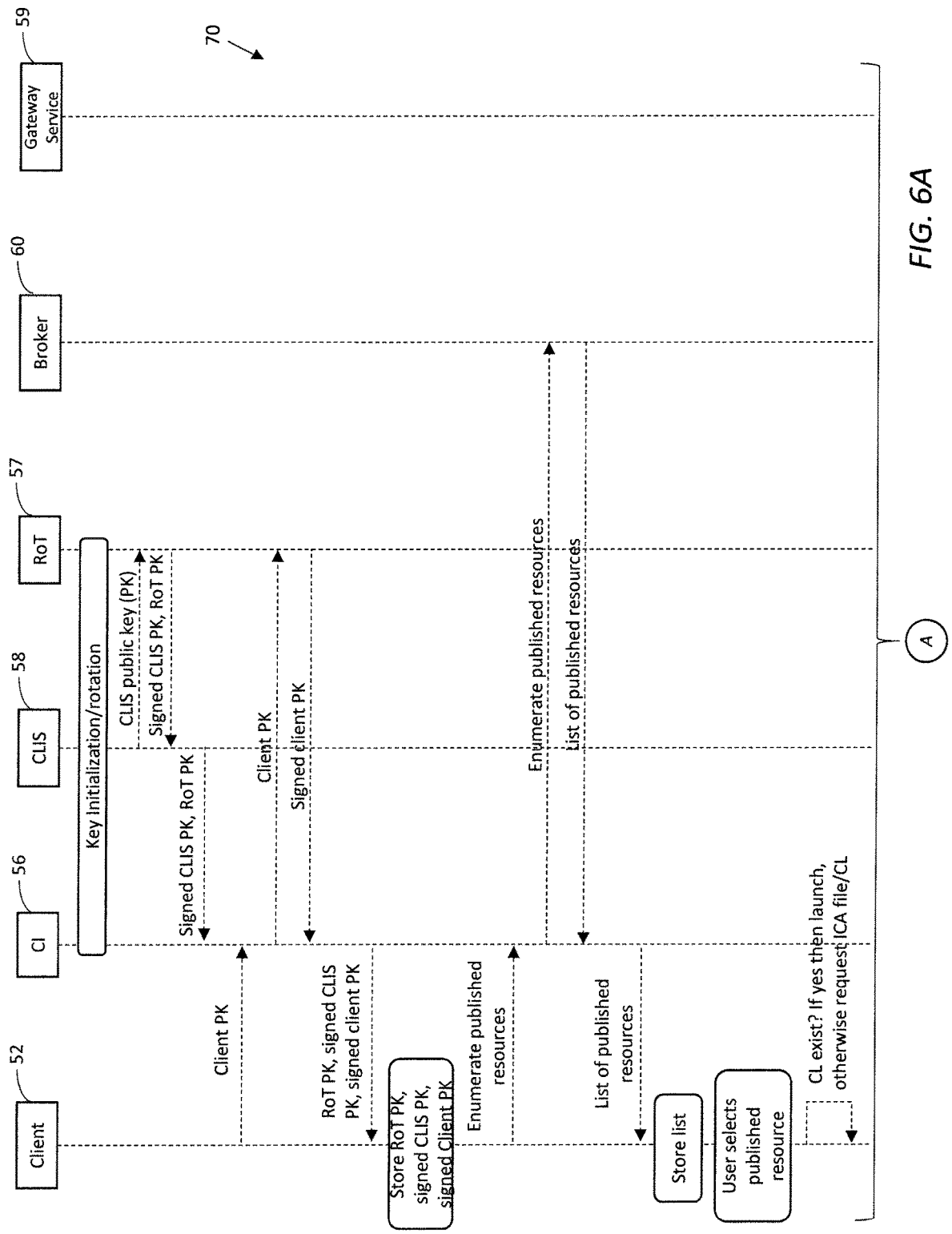
FIGS. 6A-6B are first and second portions of a sequence diagram illustrating example connection lease generation operations which may be used in accordance with the system of FIG. 5.
Figure 6B:
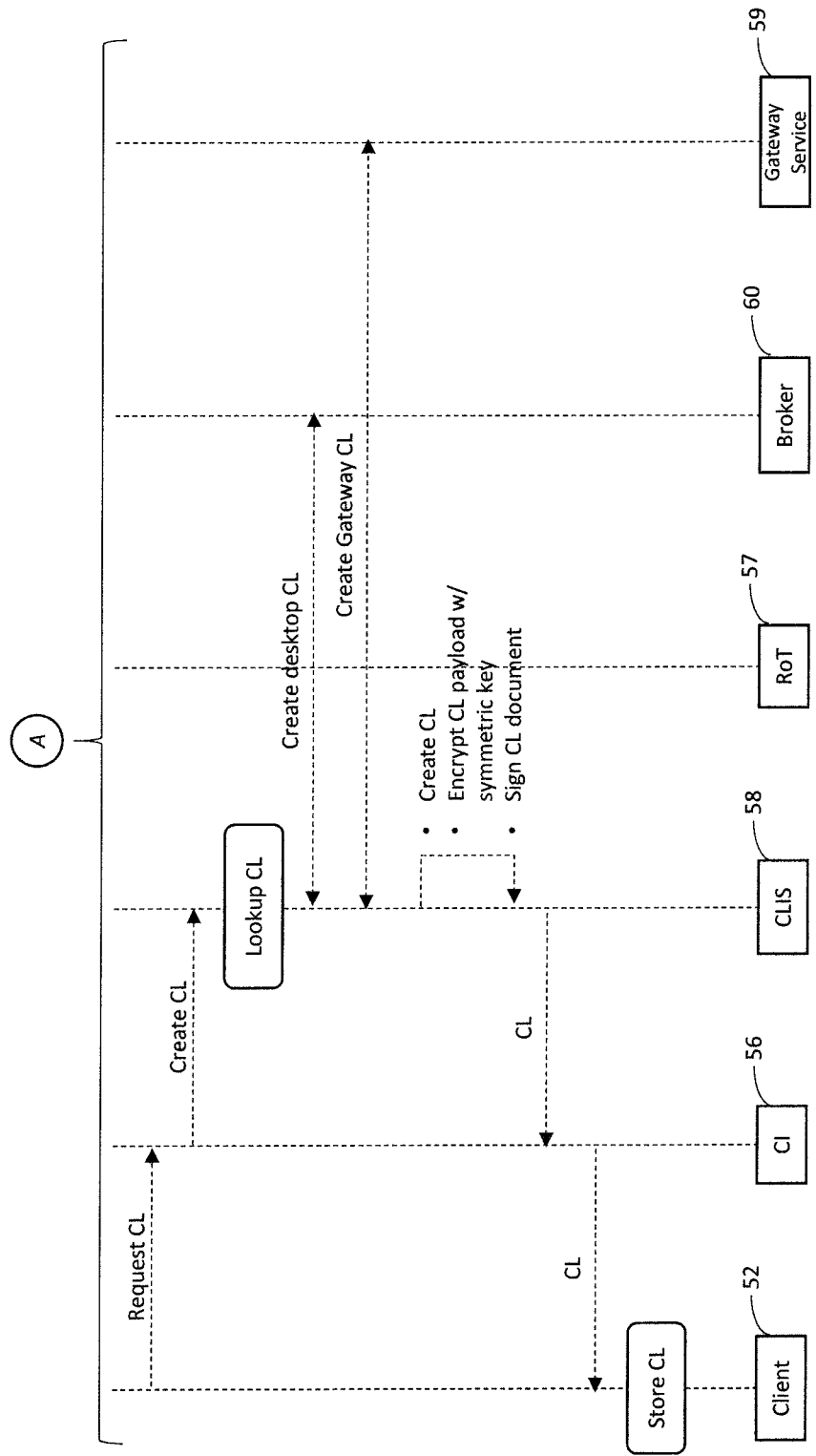

Referring additionally to the sequence diagram 70 shown in FIGS. 6A-6B, an example connection lease creation sequence is now described. The process begins with a key initialization/rotation sequence in which the CLIS 58 provides its public key to the RoT 57 to be signed by the RoT 57 private key and returned, and which is also provided to the cloud interface 56. As part of the same or separate sequence, the RoT 57 public key may also be supplied to the CLIS 58 and the cloud interface 56. Once the client device 52 provides its public key to the cloud interface 56, the cloud interface 56 provides the client device 52 public key to the RoT 57 for signature, which gets returned to the client device 52 by the cloud interface 56 along with the RoT 57 public key and the signed CLIS 58 public key, which are stored by the client device. The client device 52 then requests enumeration of published (available) virtual computing resources (e.g., virtual apps, virtual desktops, etc.), and the cloud interface 56 communicates with the broker 60 to obtain published resource information (e.g., published resource identifications (IDs), connection lease ID, connection lease type, app meta data, etc.). This information may then be communicated by the cloud interface 56 to the client device 52 where it is stored. In some embodiments the cloud interface 56 may also store this information.

When the client device 52 is ready to launch a virtual computing session 54, if the connection lease has already been created and stored then the client device 52 may proceed to launch and communicate the connection lease information to the virtual delivery appliance 53, as will be discussed further with reference to FIGS. 7A-7B below. If the connection lease has not already been created, then the client device 52 will proceed to request the connection lease from the cloud interface 56 (see FIG. 6B) by supplying the previously stored connection lease ID and connection lease type. The cloud interface 56 may then pass along the request to create the connection lease to the CLIS 58.

In the present example, the CLIS 58 may lookup the connection lease resource provider based on the supplied connection lease type. In the present example, if the connection lease type suggests a desktop lease, the CLIS 58 communicates with the broker 60 and creates a desktop (e.g., a CVAD) connection lease based upon the connection lease ID. In the present example, the CLIS 58 also communicates with the gateway service 59 to create a gateway connection lease. The CLIS 58 may further create the requested connection lease for the client device 52, encrypt the connection lease payload with a symmetric key, encrypt the symmetric key with the client device 52 public key, and sign the connection lease document. This information is then communicated back to the client device 52 via the cloud interface 56 and stored, which illustratively concludes the sequence diagram 70.

Figure 7A:
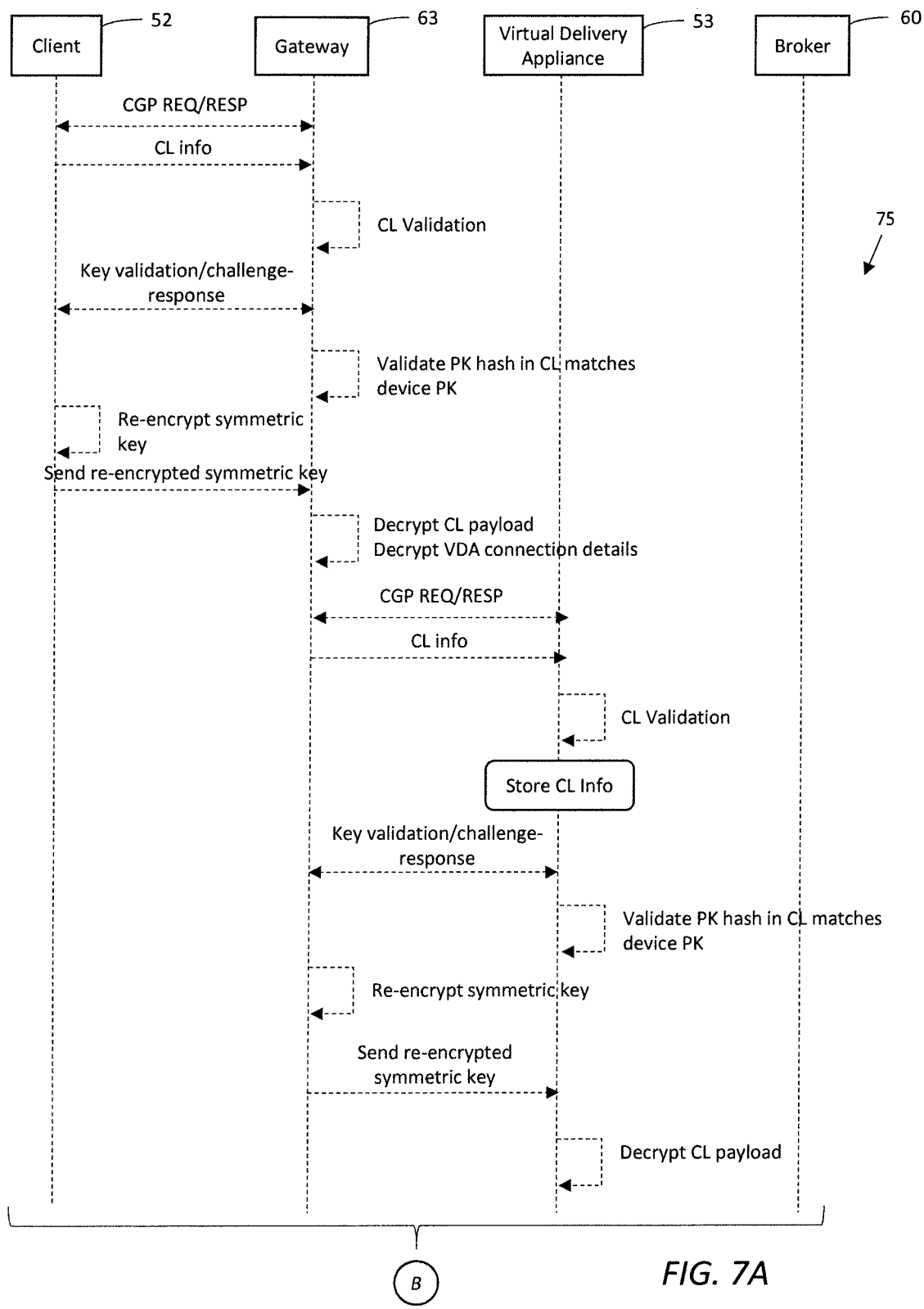
FIGS. 7A-7B are first and second portions of a sequence diagram illustrating example operations for establishing a virtual session connection using the connection lease generated in accordance with the sequence diagram of FIG. 6.
Figure 7B:
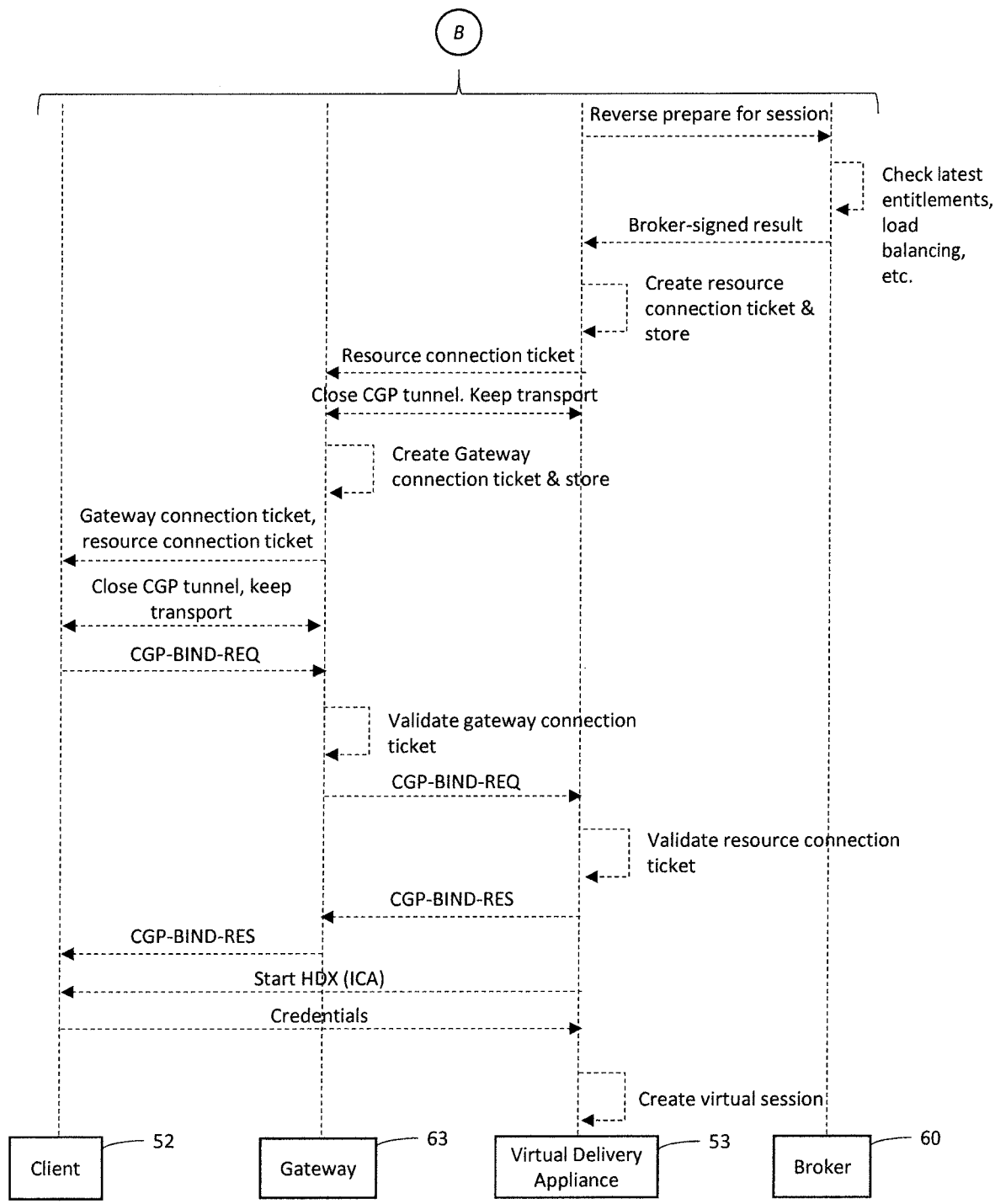

Turning now to the flow diagram 75 of FIGS. 7A-7B, example connection establishment process steps are now described once the connection lease has been obtained pursuant to the steps described above with respect to FIGS. 6A-6B. The client device 52 initiates a gateway 63/virtual delivery appliance 53 connection request/response sequence, responsive to which the client device 52 requests that a communications link or tunnel is opened by communicating to the gateway 63 the requisite connection lease information, which may include the connection lease, resource (e.g., app) ID, etc. In some embodiments a Citrix Common Gateway Protocol (CGP) tunnel may be opened. Upon validation of this information by the gateway 63 (e.g. validation of the connection lease signature and date), a key validation/challenge-response sequence is performed between the gateway and client device 52 to ensure that not only the client device 52 public key is valid (e.g. signed by the RoT 57) but also the private key signing the response matches the signed public key for the client device. Furthermore, the gateway 63 also validates that the public key hash in the connection lease matches the public key provided by the client device 52. The client device 52 then re-encrypts the symmetric key used to encrypt the connection lease payload with the gateway 63 public key and sends the re-encrypted symmetric key to the gateway 63. Using the gateway 63 private key, the gateway 63 then decrypts the symmetric key used to encrypt the connection lease payload and then proceeds to decrypt the connection lease payload and virtual delivery appliance 53 connection details identifying, for example, the particular virtual delivery appliance the client device is to be connected with.

A similar connection request/response sequence then occurs between the gateway 63 and the virtual delivery appliance 53. This may include a request to open a CGP tunnel between the gateway 63 and the virtual delivery appliance 53, which will be proxied by the gateway. The virtual delivery appliance 53 validates the connection lease details (e.g. signature and date) and stores the connection lease information. The virtual delivery appliance 53 validates that the gateway 63 public key is valid (e.g. signed by the RoT 57). The gateway 63 and the virtual delivery appliance 53 perform additional key validation challenge-response, which ensures that the gateway 63 is the true owner of its public key, etc. The gateway 63 relays the client device 52 public key to the virtual delivery appliance 53. The virtual delivery appliance 53 validates that the public key hash in the connection lease matches the client device 52 public key. Further, the gateway 63 also re-encrypts the symmetric key used to encrypt the connection lease payload with the virtual delivery appliance 53 public key, and sends the re-encrypted symmetric key to the virtual delivery appliance. The virtual delivery appliance 53 decrypts the payload and performs a real-time verification step with the broker 60 to verify the latest published resource entitlements, perform real-time user session information checks and load-balancing checks, etc. and ultimately allow or deny the connection to a virtual computing session 54. In some embodiments, this step may be known as "prepare for session" or "reverse prepare for session" because the virtual delivery appliance 53 may call into the broker 60 as opposed to the broker 60 calling into the virtual delivery appliance 53 to prepare the session. The signed result from the broker 60 is returned to the virtual delivery appliance 53, and if the session is authorized by the broker 60 then the virtual delivery appliance 53 creates a resource connection ticket, which may also be referred to as a virtual delivery appliance connection ticket, which is sent to the gateway 63, followed by a CGP finish request/response between the gateway 63 and virtual delivery appliance 53, which closes the CGP tunnel but may keep the underlying network transport open.

The gateway 63 stores the virtual delivery appliance 53 IP/port information with a secure ticket authority (STA) service (not shown), which creates and returns a STA ticket that references the stored information. The gateway 63 then forwards the STA ticket and the resource connection ticket to the client device 52. The gateway 63 then forwards a CGP finish request to the client device 52, which closes the CGP tunnel connection between the client device 52 and the gateway 63 but may keep the underlying network transport open. Now the client device 52 may send a CGP bind request to the gateway 63 to establish a new CGP tunnel based upon the STA ticket and the resource connection ticket. The gateway 63 then validates the STA ticket and subsequently provides the CGP bind request to the virtual delivery appliance 53, and also supplies the resource connection ticket. The virtual delivery appliance 53 validates the resource connection ticket and provides a response to the CGP bind request to the gateway 63, which in turn is provided to the client device 52, at which point the HDX (ICA) session is established between the client device and the virtual delivery appliance 53. The client device 52 may then forward the appropriate credentials (e.g., user name and password or authentication tokens, etc.) to the virtual delivery appliance 53. The virtual delivery appliance 53 then connects the client device 52 with the virtual computing session 54 and authenticates (e.g. logs the user in) based on the supplied credentials, which concludes the example sequence diagram 75.

Figure 8:
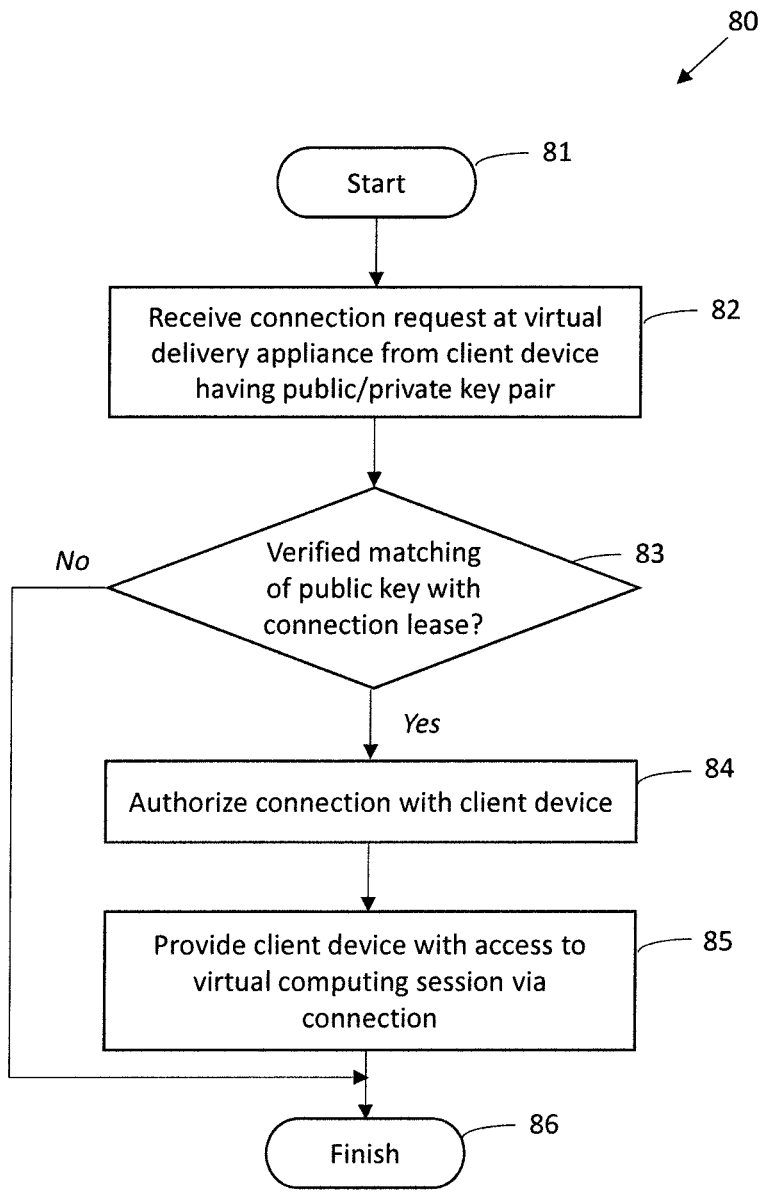
FIG. 8 is a flow diagram illustrating example method aspects associated with the system of FIG. 4.

Referring again to FIG. 4 and also the flow diagram 80 of FIG. 8, a related method is now described. The method begins (Block 81) with receiving a connection request at the virtual delivery appliance 43 from the client device 42, at Block 82. As noted above, the client device 42 has a public/private encryption key pair associated therewith, and the connection request is based upon a connection lease and the public key for the client device. Furthermore, the connection lease is generated based upon an authenticated version of the public key for the client device 42, as also discussed further above. The method further illustratively includes verifying, at the virtual delivery appliance 43, that the authenticated version of the public key upon which the connection lease was generated matches the public key for the client device 42, at Block 83. If so, the virtual delivery appliance 43 authorizes a connection with the client device 42 (Block 84) and provides the client device with access to the virtual computing session 44 via the connection, at Block 85, as also discussed further above. The method of FIG. 8 illustratively concludes at Block 86.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:
1. A computing device comprising:
 a memory and a processor cooperating with the memory and configured to receive a connection request from a client device having a public/private encryption key pair associated therewith, the connection request based upon a connection lease and the public key for the client device, and the connection lease including an authenticated version of the public key for the client device so that the connection lease is specific to the client device;

verify that the authenticated version of the public key upon which the connection lease was generated matches the public key for the client device; and authorize the connection with the client device and provide the client device with access to a virtual computing session via the connection.

2. The computing device of claim 1 wherein the processor is further configured to, prior to authorizing the connection with the client device:

initiate a challenge to be signed by the client device with the private key associated with the client device; and validate the signed response with the public key for the client device.

3. The computing device of claim 2 wherein the processor initiates the challenge and validates the signed response prior to verifying that the authenticated version of the public key upon which the connection lease was generated matches the public key for the client device.

4. The computing device of claim 2 wherein, prior to the challenge and response, the processor is further configured to validate a signature and date associated with the connection lease, and validate that the public key is valid.

5. The computing device of claim 2 wherein the processor initiates the challenge and validates the signed response after verifying that the authenticated version of the public key upon which the connection lease was generated matches the public key for the client device.

6. The computing device of claim 1 wherein the connection lease includes a hash of the authenticated version of the public key for the client device.

7. The computing device of claim 1 wherein the public/private key pair is generated at the client device using a hardware-backed key store.

8. The computing device of claim 1 wherein the processor is further configured to drop the connection with the client device based on a failure to verify that the authenticated version of the public key upon which the connection lease was generated matches the public key for the client device.

9. A method comprising:

receiving a connection request at a virtual delivery appliance from a client device having a public/private encryption key pair associated therewith, the connection request being based upon a connection lease and the public key for the client device, and the connection lease including an authenticated version of the public key for the client device so that the connection lease is specific to the client device;

verifying at the virtual delivery appliance that the authenticated version of the public key upon which the connection lease was generated matches the public key for the client device; and authorizing a connection with the client device and providing the client device with access to a virtual computing session via the connection.

10. The method of claim 9 further comprising, prior to authorizing the connection with the client device:

initiating a challenge from the virtual delivery appliance to be signed by the client device with the private key associated with the client device; and validating at the virtual delivery appliance the signed response with the public key for the client device.

11. The method of claim 10 wherein initiating and validating comprise initiating the challenge and validating the signed response prior to verifying that the authenticated version of the public key upon which the connection lease was generated matches the public key for the client device.

12. The method of claim 10 wherein initiating and validating comprise initiating the challenge and validating the signed response after verifying that the authenticated version of the public key upon which the connection lease was generated matches the public key for the client device.

13. The method of claim 9 wherein the public key for the client device is registered with a broker; and further comprising validating, at the virtual delivery appliance, that the public key for the client device is registered with the broker prior to verifying that the authenticated version of the public key upon which the connection lease was generated matches the public key for the client device.

14. The method of claim 9 wherein the connection lease includes a hash of the authenticated version of the public key for the client device.

15. A computing system comprising:

a server configured to generate a connection lease for a client device, the client device having a public/private encryption key pair associated therewith, and the connection lease including an authenticated version of the public key for the client device so that the connection lease is specific to the client device; and a virtual delivery appliance configured to receive a connection request from the client device based upon the connection lease and the public key for the client device, verify that the authenticated version of the public key upon which the connection lease was generated matches the public key for the client device, authorize a connection with the client device and provide the client device with access to a virtual computing session via the connection.

16. The computing system of claim 15 wherein the virtual delivery appliance is further configured to, prior to authorizing the connection with the client device:

initiate a challenge to be signed by the client device with the private key associated with the client device; and validate the signed response with the public key for the client device.

17. The computing system of claim 16 wherein the virtual delivery appliance initiates the challenge and validates the signed response prior to verifying that the authenticated version of the public key upon which the connection lease was generated matches the public key for the client device.

18. The computing system of claim 16 wherein the virtual delivery appliance initiates the challenge and validates the signed response after verifying that the authenticated version of the public key upon which the connection lease was generated matches the public key for the client device.

19. The computing system of claim 15 wherein the server has a public/private key pair associated therewith; wherein generated connection lease is signed with the server private key; wherein the virtual delivery appliance is further configured to, upon receiving the connection lease, verify the connection lease signature and also perform a challenge-response with the client device based upon an authenticated version of the server public key.

20. The computing system of claim 15 wherein the authenticated version of the public key is obtained following authentication from the client device to the server; and wherein the server receives the authenticated version of the public key from the client device and generates the connection lease for the client device responsive thereto.

21. The computing system of claim 15 wherein the connection lease comprises an encrypted payload and an unencrypted manifest; and wherein the authenticated version of the public key is included within the unencrypted manifest.

* * * * *